United States Patent
Alonzo et al.

(10) Patent No.: US 9,076,114 B2
(45) Date of Patent: Jul. 7, 2015

(54) MULTI-FACTOR RESOURCE ESTIMATION

(71) Applicant: Oracle International Corporation, Redwood Shores, CA (US)

(72) Inventors: Jason Aron Alonzo, Fair Oaks, CA (US); Chang Uk Chung, Mountain House, CA (US); German A. Bogomolni, Mountain House, CA (US)

(73) Assignee: Oracle International Corporation, Redwood Shores, CA (US)

( * ) Notice: Subject to any disclaimer, the term of this patent is extended or adjusted under 35 U.S.C. 154(b) by 84 days.

(21) Appl. No.: 13/804,978

(22) Filed: Mar. 14, 2013

(65) Prior Publication Data

US 2014/0282352 A1    Sep. 18, 2014

(51) Int. Cl.
 *G06F 9/44*   (2006.01)
 *G06Q 10/00*  (2012.01)
 *G06Q 10/06*  (2012.01)

(52) U.S. Cl.
 CPC ..................................... *G06Q 10/06* (2013.01)

(58) Field of Classification Search
 CPC ................................ G06F 11/36; G06Q 10/06
 See application file for complete search history.

(56) References Cited

U.S. PATENT DOCUMENTS

| | | | |
|---|---|---|---|
| 6,351,734 B1 * | 2/2002 | Lautzenheiser et al. | 705/7.17 |
| 7,328,202 B2 | 2/2008 | Huang et al. | |
| 7,559,049 B1 * | 7/2009 | Hemmat et al. | 717/102 |
| 8,055,606 B2 | 11/2011 | Kreamer et al. | |
| 2002/0178044 A1 * | 11/2002 | Bicknell et al. | 705/9 |
| 2004/0030770 A1 | 2/2004 | Pandya | |
| 2005/0114830 A1 * | 5/2005 | Knutson et al. | 717/102 |
| 2005/0129045 A1 | 6/2005 | Machulsky et al. | |
| 2006/0123389 A1 * | 6/2006 | Kolawa et al. | 717/101 |
| 2007/0240121 A1 * | 10/2007 | Spangler | 717/127 |
| 2008/0092120 A1 | 4/2008 | Udupa et al. | |
| 2008/0270210 A1 * | 10/2008 | Kratschmer et al. | 705/7 |

(Continued)

FOREIGN PATENT DOCUMENTS

| | | |
|---|---|---|
| DE | 10251441 | 6/2003 |
| EP | 2381367 | 10/2011 |
| KR | 101002025 | 12/2010 |

OTHER PUBLICATIONS

John W. Bailey et al., "A Meta Model for Software Development Resource Expenditures", [Online], 1981, pp. 107-116, [Retrieved from Internet on Feb. 14, 2015], <http://delivery.acm.org/10.1145/810000/802522/p107-bailey.pdf>.*

(Continued)

*Primary Examiner* — Thuy Dao
*Assistant Examiner* — Ziaul A Chowdhury
(74) *Attorney, Agent, or Firm* — Kilpatrick Townsend & Stockton LLP

(57) ABSTRACT

A method of estimating development resources in a feature development cycle may include receiving a selection of a feature and receiving a feature category value. The feature may be associated with a feature category. The method may also include determining one or more tasks associated with the feature category and assigning rating levels to each of the one or more tasks. The method may additionally include computing a task resource estimate for each of the one or more tasks using the corresponding rating levels. The method may further include computing a feature resource estimate for the feature using each task resource estimate and the feature category value.

19 Claims, 13 Drawing Sheets

(56) References Cited

U.S. PATENT DOCUMENTS

2008/0313008 A1 12/2008 Lee et al.
2011/0066887 A1 3/2011 Bassin et al.

OTHER PUBLICATIONS

Barry Boehm et al., "Software development cost estimation approaches—A survey", [Online], 2000, pp. 177-205, [Retrieved from Internet on Feb. 14, 2015], <http://homepages.dcc.ufmg.br/~rodolfo/es-1-09/EstimationSurvey.pdf>.*

Victor R. Basili, "Software Development: A Paradigm for the Future", [Online], IEEE1989, pp. 471-485, [Retrived from Internet on Feb. 14, 2015], <http://ieeexplore.ieee.org/stamp/stamp.jsp?tp=&arnumber=65127>.*

Albert L. Lederer et al., "Software management and cost estimating error", [Online], 1999, pp. 33-42, [Retrieved from Internet on Feb. 14, 2015], <http://ac.els-cdn.com/S0164121299000746/1-s2.0-S0164121299000746-main.pdf>.*

U.S. Appl. No. 12/636,437, Notice of Allowance mailed on Feb. 24, 2014, 10 pages.

U.S. Appl. No. 12/636,437, Notice of Allowance mailed on May 23, 2014, 9 pages.

Meli, R., et al. "Function Point Estimation Methods: A comparative Review", Data Processing Organization, The European Software Measurement Conference, 1999, 14 pages.

Author Unknown, "How to do Estimating Testing Effort?", FYICenter.com, Copyright 2008, retrieved from http://sqa.fyicenter.com/FAQ/Testing-Techniques/How_to_do_Estimating_Testing_Effort_html., 8 pages.

Author Unknown, "Software Testing Effort Estimation", Software Testing Times, Copyright 2009, Retrieved from http://www.softwaretestingtimes.com/2010/04/software-testing-effort-estimation.html on Nov. 19, 2013, 7 pages.

Author Unknown, "Software Testing Estimation Techniques", Rishabh Software, Feb. 28, 2012, Retrieved from http://rishabhsoft.com/blog/software-testing-estimation-techniques, 5 pages.

* cited by examiner

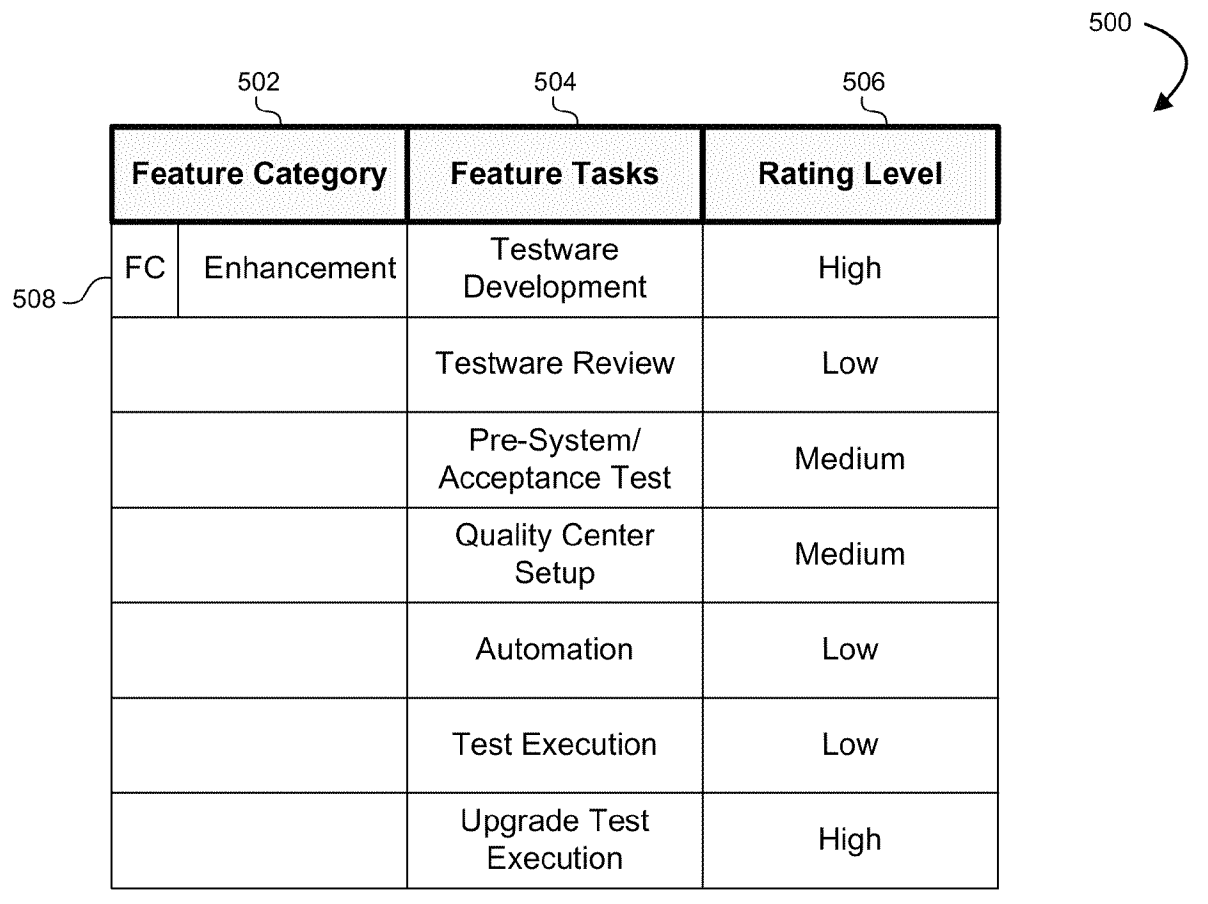

| Feature Category | Feature Tasks | Rating Level |
|---|---|---|
| Enhancement | Testware Development | High |
| | Testware Review | Low |
| | Pre-System/ Acceptance Test | Medium |
| | Quality Center Setup | Medium |
| | Automation | Low |
| | Test Execution | Low |
| | Upgrade Test Execution | High |

FIG. 5

| Feature Category (FC) | Feature Tasks | Rating Level | Adjustment Factors (AF) | Weight |
|---|---|---|---|---|
| Enhancement | Testware Development | High | Impact on Integration | W1 |
| | Testware Review | Low | Impact on Existing Features | W2 |
| | Pre-System/ Acceptance Test | Medium | Platform Coverage | W1 |
| | Quality Center Setup | Medium | Feature Criticality | W4 |
| | Automation | Low | Manual Test Execution | W2 |
| | Test Execution | Low | Ability to Leverage Prior Releases | W2 |
| | Upgrade Test Execution | High | Ability to Leverage Prev Automation | W7 |

FIG. 7

MULTI-FACTOR RESOURCE ESTIMATION

BACKGROUND

Estimating resources that are needed to perform each pertinent task during a software feature development cycle may be considered a key portion of the project planning phase and engineering development cycle. Each task may be performed by different systems and/or individuals, each of which may execute a different role during both the planning and execution phase. The estimated resources may be required as an input, along with other information, for most project management engineering solutions. However, accurately determining resource estimates with precision is a difficult problem. Deriving estimates that are close to reality are currently lacking with existing methodologies and tools. In many cases, resource estimation is determined non-deterministically, using guesses of a project manager without any consistent criteria and methodology that are systematically applicable across multiple cycles within an organization. This absence of uniformity and standardization results in unrealistic comparables in the project timeline. Precisely estimating the resources required for software development, software quality assurance tasks, and project management steps during the software development cycle is not only challenging, but the failure to estimate accurately can result in significant inefficient use of resources, and potentially can create extensive costs. Therefore, improvements in the art are needed.

BRIEF SUMMARY

In one embodiment, a method of estimating development resources in a feature development cycle may be presented. The method may include receiving a selection of a feature and receiving a feature category value. In some embodiments, the feature may be associated with a feature category. The method may also include determining one or more tasks associated with the feature category and assigning rating levels to each of the one or more tasks. The method may additionally include computing a task resource estimate for each of the one or more tasks using the corresponding rating levels. The method may further include computing a feature resource estimate for the feature using each task resource estimate and the feature category value.

In some embodiments the method may also include receiving task resource usages that were used to complete each of the one or more tasks; computing tolerance factors using a difference between each of the task resource usages and each of the corresponding task resource estimates; and adjusting the rating levels assigned to each of the one or more tasks if the corresponding tolerance factor meets or exceeds a threshold value. In some embodiments, The method may additionally include receiving a selection of a first task in the one or more tasks; accessing a plurality of tasks where each of the plurality of tasks may be similar to the first task, each of the plurality of tasks may be assigned a first rating level, and each of the plurality of tasks may be associated with different features; and adjusting the first rating level based on a comparison between the first rating level and a plurality of task resource usages associated with the plurality of tasks. The first rating level may represent a number of person effort days.

In some embodiments the method may further include assigning a weight to each of the one or more tasks. Each task resource estimate for each of the one or more tasks may be computed using the corresponding weight. The weights may represent increases or decreases to the corresponding rating levels based on evaluations of historical task resource usages previously recorded in association with the corresponding task. In some embodiments, the method may also include assigning an adjustment factor to each of the one or more tasks. Each task resource estimate for each of the one or more tasks may be computed using the corresponding adjustment factor. The adjustment factors may represent increases or decreases to the corresponding rating levels based on evaluations of the corresponding task environment.

In another embodiment, a computer-readable memory may be presented. Then computer-readable memory may comprise a sequence of instructions which, when executed by one or more processors, causes the one or more processors to estimate development resources in a feature development cycle. The instructions may cause the processor(s) to receive a selection of a feature and receive a feature category value. The feature may be associated with a feature category. The instructions may also cause the processor(s) to determine one or more tasks associated with the feature category and assign rating levels to each of the one or more tasks. The instructions may additionally cause the processor(s) to compute a task resource estimate for each of the one or more tasks using the corresponding rating levels. The instructions may further cause the processor(s) to compute a feature resource estimate for the feature using each task resource estimate and the feature category value.

In yet another embodiment, a system may be presented. The system may include one or more processors and a memory communicatively coupled with and readable by the one or more processors. The memory may comprise a sequence of instructions which, when executed by the one or more processors, cause the one or more processors to estimate development resources in a feature development cycle. The instructions may cause the processor(s) to receive a selection of a feature and receive a feature category value. The feature may be associated with a feature category. The instructions may also cause the processor(s) to determine one or more tasks associated with the feature category and assign rating levels to each of the one or more tasks. The instructions may additionally cause the processor(s) to compute a task resource estimate for each of the one or more tasks using the corresponding rating levels. The instructions may further cause the processor(s) to compute a feature resource estimate for the feature using each task resource estimate and the feature category value.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 5 illustrates a diagram of tasks associated with rating levels, according to one embodiment.

FIG. 7 illustrates a diagram of tasks associated with weights, according to one embodiment.

DETAILED DESCRIPTION

Figure 1:
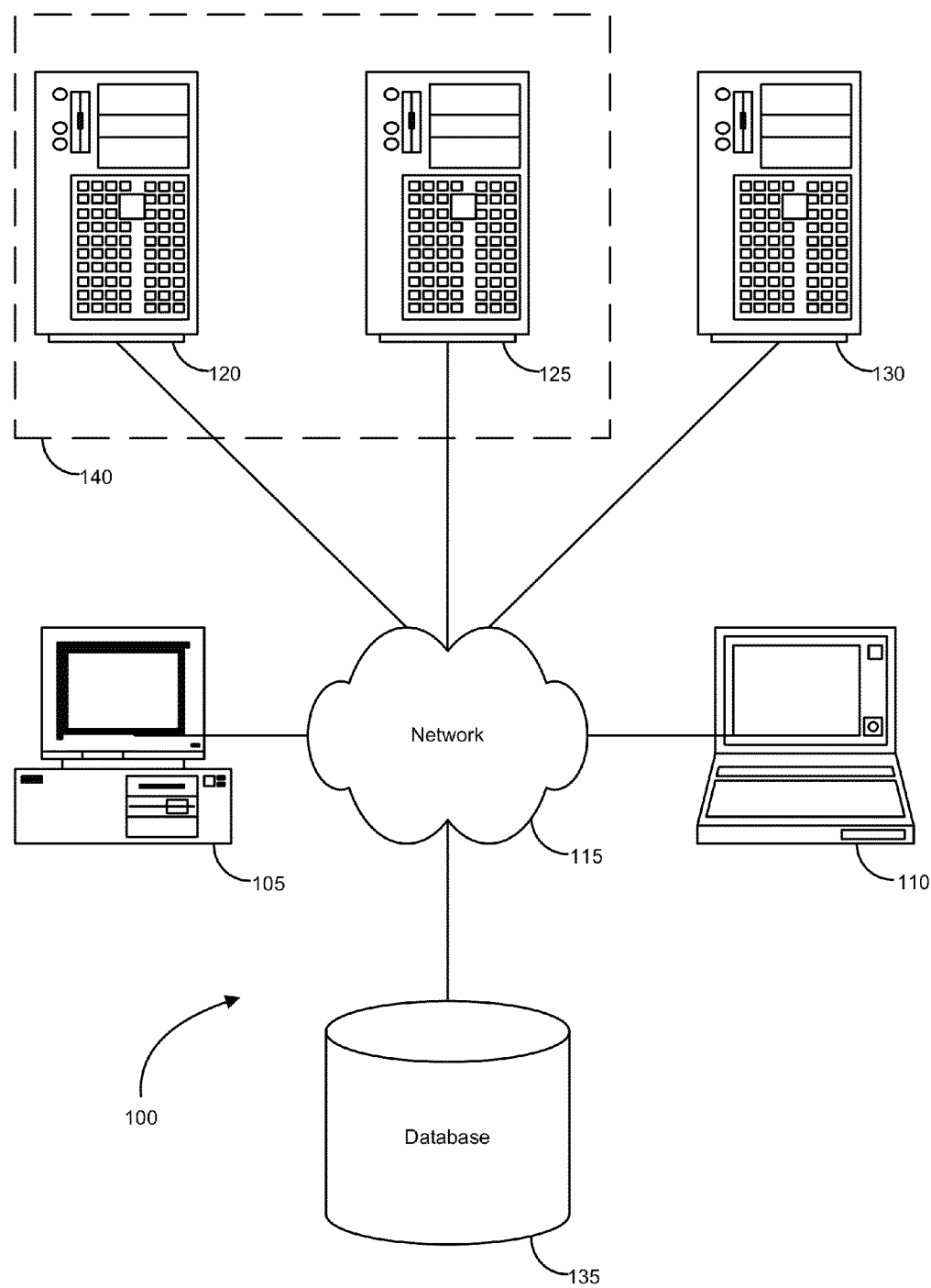
FIG. 1 illustrates a block diagram of components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Each of the embodiments disclosed herein may be implemented in a general-purpose computer system. FIG. 1 is a block diagram illustrating components of an exemplary operating environment in which various embodiments of the present invention may be implemented. The system 100 can include one or more user computers 105, 110, which may be used to operate a client, whether a dedicated application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network can be any type of network familiar to those skilled in the art that can support data communications using any of a variety of commercially-available protocols, including without limitation TCP/IP, SNA, IPX, AppleTalk, and the like. Merely by way of example, the network 115 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
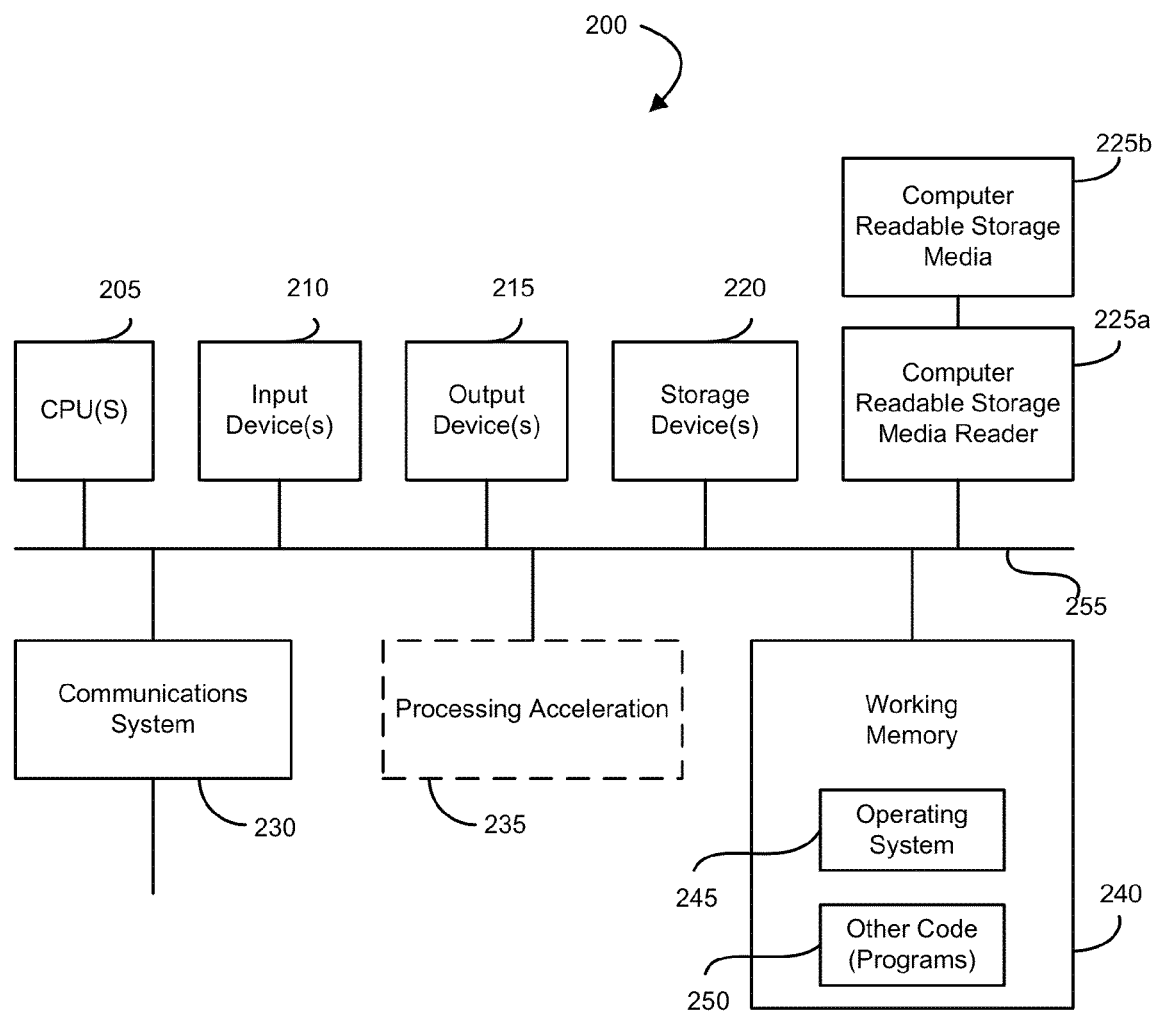
FIG. 2 illustrates a block diagram of an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Each of the methods described herein may be implemented by a computer system, such as computer system 200 in FIG. 2. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed by the computer without human intervention. Therefore, it will be understood in light of this disclosure, that each step and each method described herein may be altered to include an input and output to and from a user, or may be done automatically by a computer system. Furthermore, some embodiments of each of the methods described herein may be implemented as a set of instructions stored on a tangible, non-transitory storage medium or memory to form a tangible product.

Described herein, are embodiments for estimating development resources in a feature development cycle. A selected feature may be determined to belong to a particular feature category. A feature category value may be assigned to or determined to be associated with the feature category. A plurality of tasks may be enumerated for the particular feature category. These tasks may represent discretes milestones or phases gates that may need to be accomplished in order to complete the feature development. A task resource estimate may be computed for each of the tasks associated with the feature category. Then, using the individual task resource estimates, a feature resource estimate may also be determined.

As used herein, a "feature" may refer to any tangible good, service, software product, downloadable software application, physical product, and/or the like. In some embodiments, a feature may include a portion of a product, application, and/or service. For example, a feature may include a software upgrade to be distributed to existing applications. Likewise, a feature may include a replacement part for a tangible product. A feature may also include a follow-up service visit to perform maintenance. Many examples described herein may use a software product as an example; however, the principles described in relation to a software product or the quality assurance cycle may be readily applied to any other type of feature described like those above.

As used herein, a "development cycle" may include any portion of a process used to create, engineer, design, manufacture, distribute, upgrade, service, collect, and/or dispose of a feature. A "resource" may be used to refer to any input to the development cycle. For example, a resource may include human efforts measured in hours or person days. A resource may also include computer processing power, processing time, memory usage, storage costs, power consumption, and/or the like. A resource may also include physical resources consumed or incorporated during manufacturing process, such as raw materials, fuel, computer storage mediums, computer hardware, tools, adhesives, manufacturing machinery, and/or the like. A resource may also include shared resources, such as manufacturing machinery, equipment, remote processing facilities, and/or the like. In some embodiments, a resource may include transmission bandwidth, or other resources used to transmit data between points.

In many cases, companies may estimate the required resources using a guess-based methodology (such as SWAG) or other methodologies that guess as to the resources needed to complete the feature development cycle as a whole. Some commercial software tools are available, such as COCOMO and SEER-SEM; however, the methodologies used by these products can be very ineffective in determining the actual resources required for feature development. Additionally, many of these tools ultimately require a best-guess input from a user in order to complete their calculations. For example, COCOMO requires an estimate of a number of lines of code at the beginning of a project, an estimation which is nearly impossible to guess correctly, and which can have a wide variance. Also, resources such as coding effort may not be directly proportional to code length. Other methods may produce more reliable results; however, the complexity in the input parameters and the lack of a capacity to adapt to new development techniques and technologies renders these products ill-suited for complex development tasks.

Figure 3A:
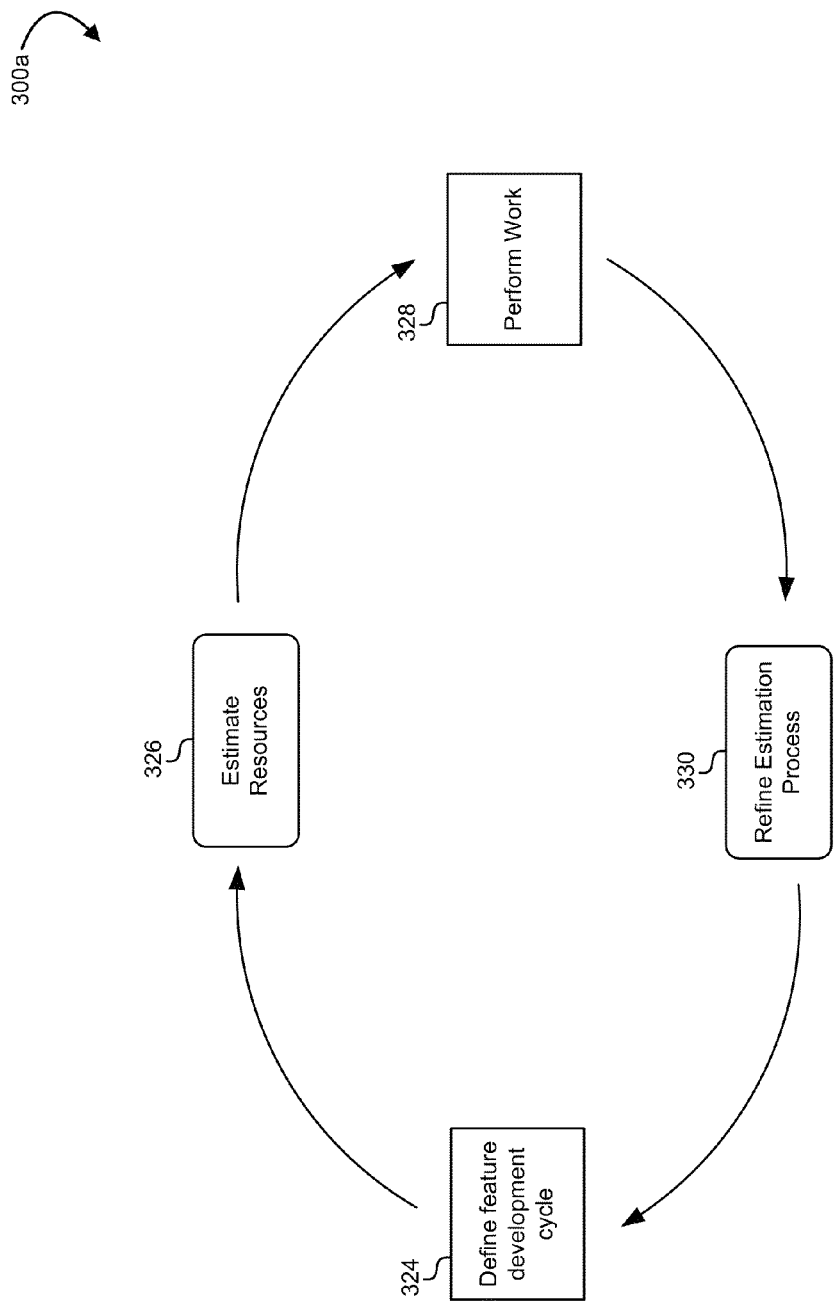
FIG. 3A illustrates a block diagram of a resource estimation sequence with a feedback loop, according to one embodiment.

In some embodiments described herein, a multi-factor approach may be presented. FIG. 3A illustrates a block diagram 300a of a resource estimation sequence with a feedback loop, according to one embodiment. The process may begin by defining a feature development cycle (324). The feature development cycle may comprise a set of engineering requirements that can be met by breaking the feature development cycle down into a discrete number of smaller tasks. Characteristics of the feature development cycle, as well as historical data, may be provided as an input to a resource estimation process.

After defining the feature development cycle, systems described herein may perform an estimation process for determining a resource estimate for each task associated with the development cycle (326). In some embodiments, the resource estimation process may include a multifactor analysis that includes a rating level, adjustment factors, weightings, feature characteristics, and/or other historical data and values that characterize or adjust the estimation procedure. The resource estimation process may provide an output to a project manager or a project management software suite to be used in estimating costs, procurements, employee workloads, and/or the like. Furthermore, the estimated resources associated with time and effort may be included in a project management report or software system.

After estimating the required resources, the tasks defined by the feature development cycle may be performed (328). As the tasks are performed, resources may be consumed as needed by the feature development. While a multi-factor analysis performed by the resource estimation process described herein may provide a very accurate forecast of required resources, various factors may arise during the actual development cycle that cause the feature development to require more or fewer resources than were estimated. Periodically throughout the development process, or alternatively at the end of the development process, an actual task resource usage may be determined. The actual task resource usage represents an amount of resources actually used during the feature development cycle. In some embodiments, the task resource usage may be measured and recorded for each individual task in the feature development cycle.

After recording the task resource usage for each task, the estimation process may be refined (330). In other words, a feedback loop may be closed in order to use deficiencies found in the estimated results when compared to actual resource usage. Any of the factors used in the multifactor analysis may be adjusted according to the actual resource usage for either the task or the feature development cycle as a whole. The feedback loop provides a way for the resource estimation process to improve over time and more accurately estimate resource usage. Furthermore, as a process is refined over time, the complexity of the inputs, the number of factors, and/or the time required by the estimation process may be reduced.

Resource Estimation

Figure 3B:
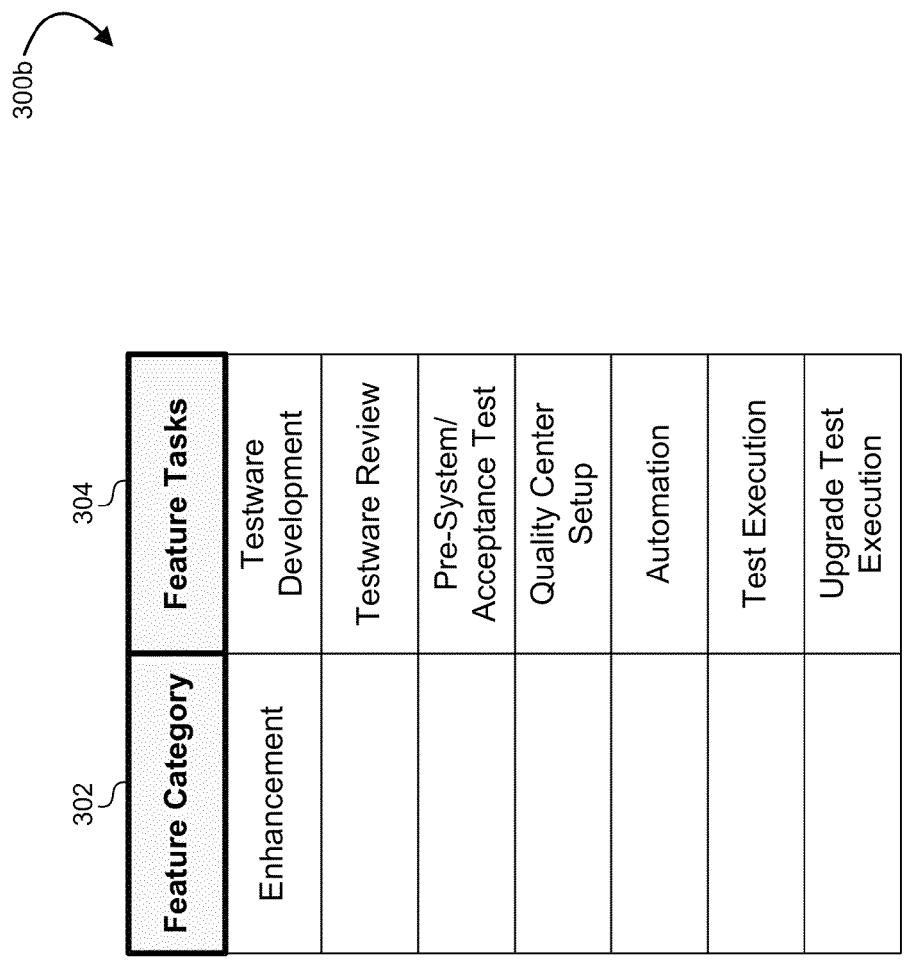
FIG. 3B illustrates a diagram of tasks associated with a feature category, according to one embodiment.

FIG. 3B illustrates a diagram 300b of tasks associated with a feature category, according to one embodiment. A particular feature may be determined to be associated with a particular feature category. A feature category may be a descriptive categorization of a feature type. Examples of the feature category may include new development, regression, enhancement related, security patch, feature addition, and/or the like. In one sense, a feature category may be thought of as a type describing the overall development cycle. A "new development" feature category may be used to describe a feature development that is not already part of an existing system. An "enhancement related" feature category may be used to describe an addition, alteration, and/or upgrade to an existing feature on an existing product.

For each feature category, one or more feature tasks, or simply "tasks," may be defined or enumerated. In some embodiments, selecting a feature category may automatically populate a list of feature tasks. The tasks may be stored in a feature task database and retrieved automatically by the selection of a feature category. In some embodiments, the list of feature tasks may be edited by a user and/or an input computer system. In the example of diagram 300b, a particular feature associated with the "enhancement" feature category 302 has been selected. After selection of the feature category 302, a list of tasks 304 may be provided to the resource estimation process. In some cases, the list of tasks 304 may be presented to a user for possible alteration. For example, a user may determine that the task of "Pre-System/Acceptance Test" may not apply to this particular feature, even though it would typically be applied to other features in the feature category 302.

The list of tasks 304 associated with the feature category 302 may be any tasks related to the overall development cycle effort. In this particular example, the feature may relate to adding or enhancing a new software feature to an existing software product. The list of tasks 304 may include tasks such as testware development, testware review, pre-system/acceptance testing, quality center set up, automation, test execution, and/or upgrade test execution. This list of software related tasks is merely exemplary, and other feature types may include different types of tasks.

Figure 4:
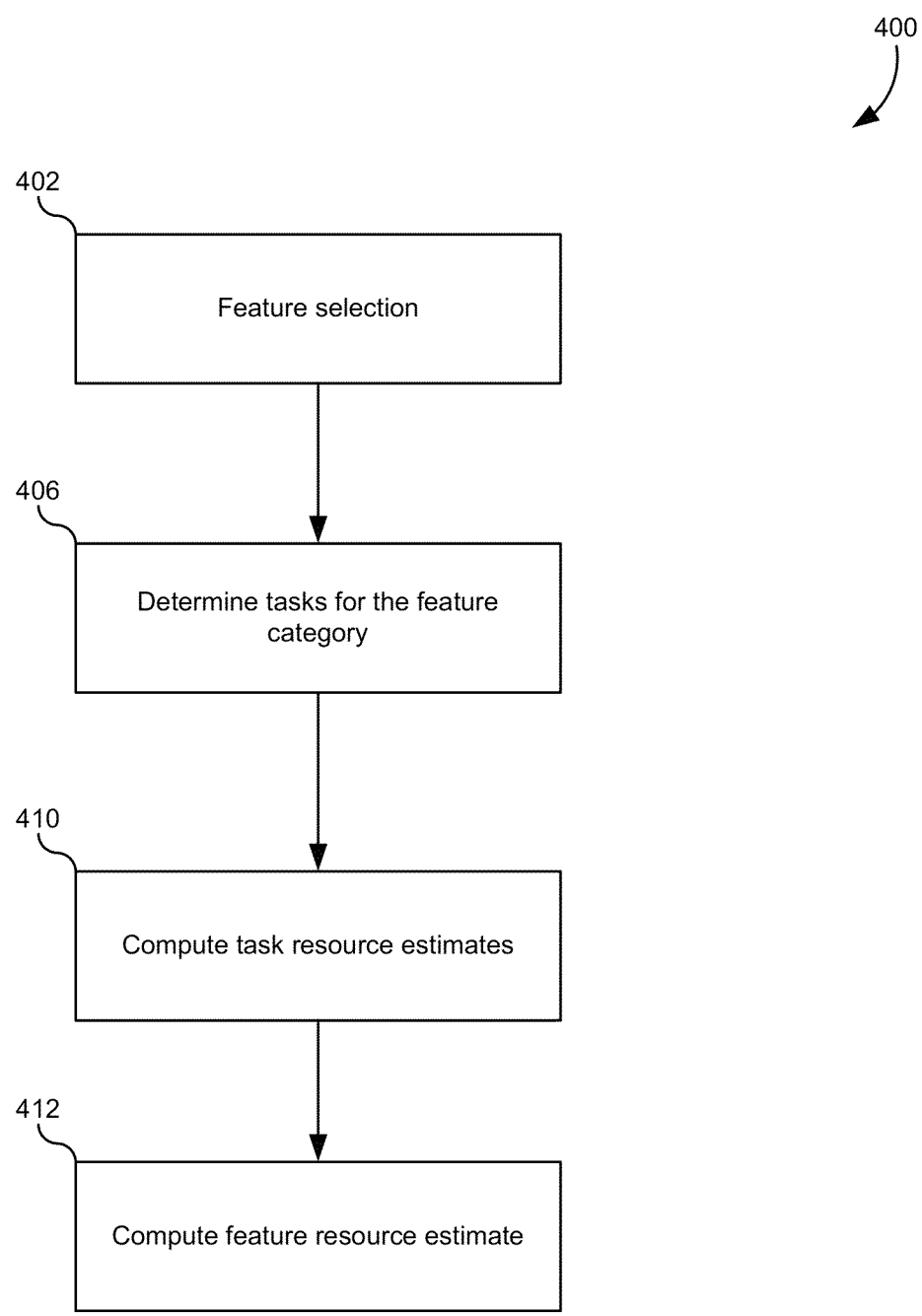
FIG. 4 illustrates a flowchart of a method of estimating resources in a feature development cycle, according to one embodiment.

FIG. 4 illustrates a flowchart 400 of a method of estimating resources in a feature development cycle, according to one embodiment. The method of flowchart 400 may represent a broad description of a general method to which additional details may be added throughout the course of this disclosure. The method may include receiving a selection of a feature (402). The feature may be selected by a user, or may be selected as part of an automated project planning process. In some embodiments, the resource estimation process may be part of an Enterprise Resource Planning (ERP) software suite. Workflows or other automated inputs may provide a feature selection to the process. Additionally, some embodiments may automatically select a feature as part of the resource estimation process. In this case, one portion of the process may select the particular feature and provide that feature as an input to another portion of the process.

The feature may be associated with a feature category. The feature category may be automatically determined by virtue of the feature itself, or may be assigned by a user or input process. The method may also include determining tasks for the feature category (406). As described above, the tasks may be entered manually by a user, provided automatically by an ERP software suite, retrieved from a database, presented to a user, edited by a user, and/or otherwise altered to meet particular needs of the feature under development.

In some embodiments to be described below, additional steps may also be added to the process. For example, the steps may include assigning a weight, assigning one or more adjustment factors, assigning a rating level, and/or the like. These additional optional steps will be described in more detail below. Descriptions of each of these features may be inserted as a part of the description of flowchart 400 by one having skill in the art.

The method may also include computing a task resource estimate for each of the tasks associated with the feature category (410). The task resource estimate for each of the tasks may be generated using a single process. Alternatively, each task may use a process that has been tailored to analyze its individual needs. The task resource estimates may be calculated using any of the factors provided as inputs for the feature, the task, or the feature category. Particular equations and methodologies for computing the task resource estimates will be described further below.

The method may also include computing a feature resource estimate (412). In some embodiments, the feature resource estimate may be computed using each of the individual task resource estimates previously computed. This methodology allows a development cycle to be broken down into manageable tasks of any level of complexity. Each task and its associated task resource estimate can be analyzed individually. This may greatly simplify the resource estimation process compared to processes that estimate only at the top level. Additionally, this may allow an analysis of how each individual task affects the resources required for the overall development cycle. Bottlenecks may be identified and inefficiencies may be remedied by analyzing how individual tasks contribute to the total feature resource estimate.

FIG. 5 illustrates a diagram 500 of tasks associated with rating levels, according to one embodiment. In diagram 500, two additional factors are added to the resource estimation process. First, rating level 506 may be added to each of the list of tasks 504. As used herein, a rating level may represent a metric used to define an amount of resources required by a particular task. The rating level 506 may be considered a baseline resource estimation in the absence of any other factors. In some embodiments, the rating level 506 may represent a number of person effort days or hours required to complete a task. For example, the rating level 506 may represent five person days of effort required for a task. The rating level 506 may be specific to each of the list of tasks 504. In other embodiments, a rating level may be assigned to a particular feature category 502, and that rating level may be assigned as a default to each of the list of tasks 504 associated with the feature category 502.

In some embodiments, the rating level 506 for each task may be retrieved from a rating level database. In other embodiments, the rating level 506 may be received as an input from a user. In other embodiments, the rating level 506 may be automatically determined based on historical data. For example, the rating level 506 for automation may be set automatically to "low" if the last automation task for the feature category 502 was assigned a low rating level. Additionally, historical averages may be used, as well as historical minimums, maximums, means, modes, and/or any other statistical function of historical data to assign a rating level 506.

In this particular embodiment, the rating level 506 may be assigned a high, medium, or low rating. These values are merely exemplary, and real-world systems may often have many different levels that may be assigned. In some embodiments, the rating level 506 may represent a numerical value. In some embodiments, a descriptive term, such as high, may be equated with a numerical value, such as 15 person days of effort or 12 hours of computing time.

In some embodiments, the rating level 506 may be adjusted up or down using any of the other factors provided by the embodiment. These factors will be described in greater detail below. One such factor is a feature category value 508 that may be associated with the feature category 502. The feature category value 508 may be a modifier that increases or decreases the resource amount indicated by the rating level. While the rating level may be assigned to each individual task in the list of tasks 504, the feature category value 508 may be assigned to the feature category 502 to be applied to each of the list of tasks 504.

Conceptually, the feature category value 508 may be a modifier that takes into account the relative difficulty of the entire feature development cycle. For example, the "enhancement" feature category may describe enhancements to existing features. As a whole, the development cycle for this feature may take less time than other tasks because an existing framework is being edited rather than designed from scratch. Therefore, it may be expected that each of the tasks in the enhancement feature category may take less time than their rating level might initially suggest. Therefore, the feature category value 508 may scale or diminish the rating level 506 of each of the list of tasks 504 to account for this assumption. Similarly, a "new development" feature category may require more time than the rating levels would suggest because the feature will be designed from scratch. Therefore, the feature category value 508 may scale or increment each rating level 506 to account for this assumption.

In some embodiments, the feature category value 508 may be expressed as a ratio that can be multiplied or otherwise combined with the rating level. A feature category value 508 that expresses an increased difficulty for the feature category 502 may be larger than 1.0, such as 1.2. A feature category value 508 that expresses a decreased difficulty for the feature category 502 may be less than 1.0, such as 0.85. In other embodiments, the feature category value 508 may be expressed as a scalar value, such as 2 person days, that can be added to or subtracted from the rating level. Other embodiments may use other mathematical or logical operators to combine a value with the rating level. It will be understood that all other modifying factors—including the adjustment factors and weights described below—may be expressed as ratios, scalars, and/or the like depending on the particular embodiment.

Figure 6:
FIG. 6 illustrates a diagram of tasks associated with adjustment factors, according to one embodiment.

FIG. 6 illustrates a diagram 600 of tasks associated with adjustment factors, according to one embodiment. Like a feature category value 608, an adjustment factor 610 may be used to adjust a rating level 606. Each of the list of tasks 604 may include one or more adjustment factors 610. Like the rating level 606, each of the list of tasks 604 may be assigned individual adjustment factors 610, while the feature category value 608 may be applied to each of the list of tasks 604.

Adjustment factors may conceptually be described as a way to adjust the outcome of the result based on circumstances of the particular task. While the feature category value 608 may represent perceived adjustments that may need to be made to the particular feature category 602 in relation to other feature categories, adjustment factors may be based on the individual specifics of the particular task. For example, if automation is required, and a similar automation has already been created in the past, only minor adjustments to the existing automation may be required. Therefore, an adjustment factor could be added to the automation task that will be less than 1.0. In another example, an integration task may normally be associated with the rating level of low, or five person days of effort. However, for integration that involves two different software or computing environments, an adjustment factor may be added that is greater than 1.0. Similarly, for integration that involves only a single software environment, an adjustment factor may be added that is less than 1.0.

In yet another example, the adjustment factors 610 may take into account other aspects of the particular task outside of raw difficulty, such as feature criticality. Critical features may require an increasing adjustment factor to prevent compressed schedules that may cause mistakes. Features that are being deployed to only a small number of users may be provided with a decreasing adjustment factor to reflect the relatively minor consequences of mistakes in the development process. Similarly, widespread deployments may use an increasing adjustment factor to reflect the major consequences of even minor mistakes during the development cycle.

Like the feature category value 608, the adjustment factors 610 may be expressed as ratios, scalars, and/or the like, and may be combined with the rating level 606 for each task using any mathematical or logical operation.

FIG. 7 illustrates a diagram 700 of tasks associated with weights, according to one embodiment. Weights 712 may be handled, defined, and incorporated in a manner similar to the adjustment factors 710 and the feature category value 708 of the feature category 702. Like the rating levels 706 and the adjustment factors 710, each of the list of tasks 704 may be assigned an individual weight 712.

The weight 712 may be thought of as a "catch-all" factor that may be used to adjust a rating level 706. In some embodiments, the weight 712 may be assigned based on historical data. In the first iteration of a particular task for a particular feature, the weight 712 may be assigned as 1.0. After incorporating adjustment factors 710, a feature category value 708, and a rating level 706 into a subsequent iteration of the particular task, a project manager may feel that estimated resources for the particular task may be too high or too low. For example, the project manager may examine historical data and determine that although the estimated resources may be correct for a previous task/feature category combination, this particular task/feature category combination may introduce difficulties that have not been captured adequately by the adjustment factors 710 or the feature category value 708.

In some embodiments, a weight adjustment made by the project manager may be accompanied by a description of the reason for making the adjustment. Weights may be particularly helpful when the output of the resource estimation process is input directly into a project management software suite in an ERP. Instead of manually adjusting the output, a project manager may instead adjust the weight input to achieve the desired outcome after examining the output with a weight of 1.0.

In some embodiments, the weight may be calculated and adjusted automatically using past projects and system feedback. For example, the resource estimation process may automatically increase the weight for projects that have not been done by a particular department or team, while decreasing the weight for projects where more experience is attributed to the team members. In other examples, the resource estimation process may automatically adjust the weight to compensate for resource bottlenecks or shortages that are automatically monitored by the computer system.

Figure 8:
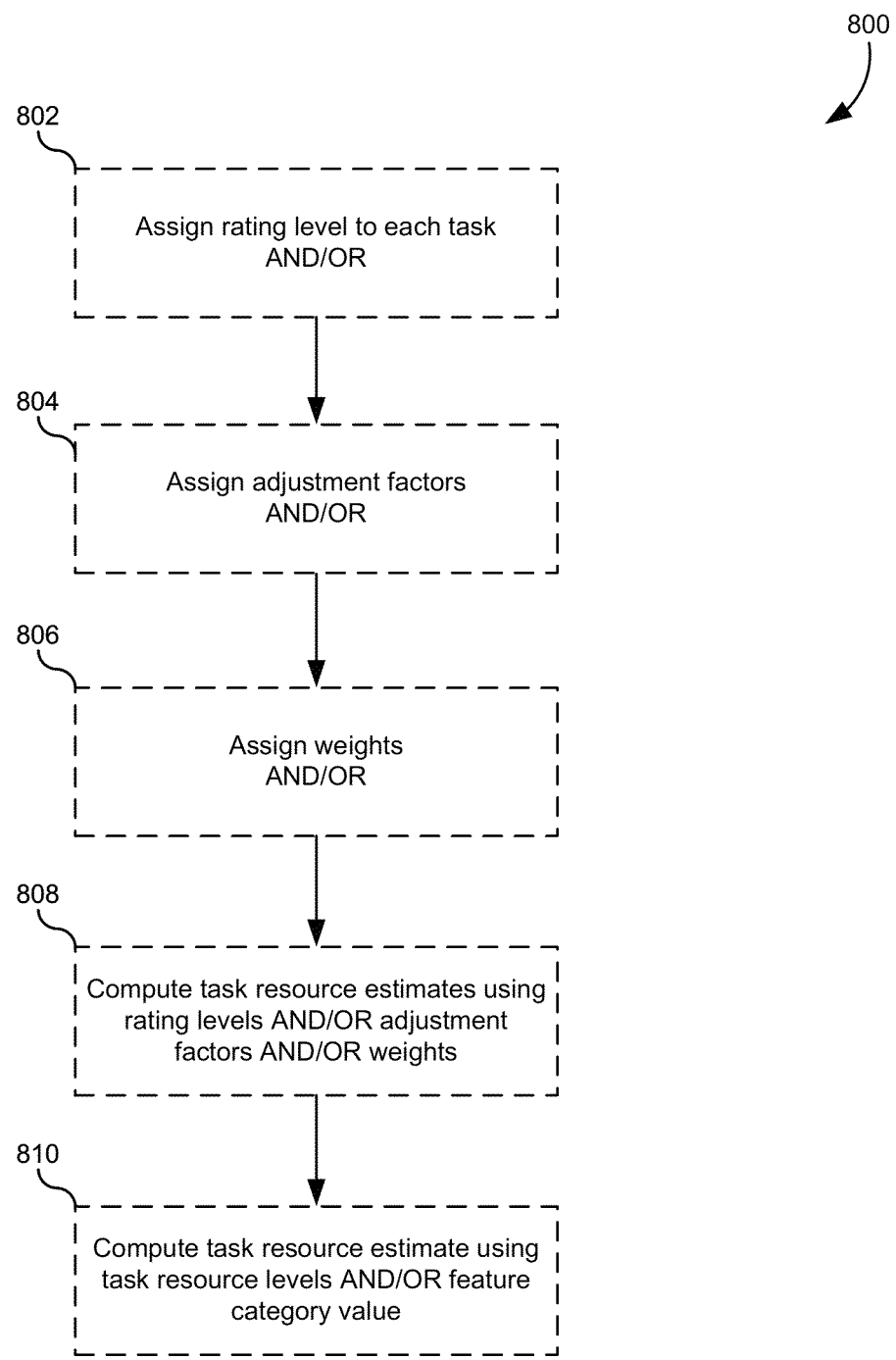
FIG. 8 illustrates a flowchart of a method for computing a task resource estimate, according to one embodiment.

FIG. 8 illustrates a flowchart 800 of a method for computing a task resource estimate, according to one embodiment. Each step in flowchart 800 is enclosed within a dashed border, signifying that each of these steps is optional, and that each of these steps may be integrated into flowchart 400 of FIG. 4. The first four steps of flowchart 800, including steps 802, 804, 806, and 808, may be considered an elaboration upon step 410 of flowchart 400 where the task resource estimates are computed.

The method may include assigning a rating level to each task (802). The method may additionally include assigning adjustment factors to each task (804). The method may further include assigning weights to each task (806). In each of these steps, the rating level, the adjustment factors, and/or the weights, may be assigned by a human operator or determined automatically by a computer system. When determined automatically, the determination may be made using a combination of historical data from past tasks, as well as information derived from the current combination of tasks in the feature category.

Depending on the particular embodiment, rating levels, adjustment factors, and weights may be mixed and matched individually. For example, one embodiment may use only weights, while another embodiment may use rating levels and adjustment factors. Some embodiments described above may use all three factors.

The method may also include computing task resource estimates using rating levels and/or adjustment factors and/or weights (808). The task resource estimates may be calculated using any combination of mathematical and/or logical operations. In one embodiment, each task resource estimate (TRE) may be computed using the adjustment factors (AF), the rating level (RL), and the weight (W) using the following equation:

$$TRE = AF \times RL \times W. \quad (1)$$

Note that equation (1) calculates the task resource estimate without including the feature category value (FCV). The feature category value may be included when calculating the task resource estimate or may be applied later when the task resource estimates are used to calculate the feature resource estimate. For the task resource estimate, the following equation may be used:

$$TRE = FCV \times AF \times RL \times W. \quad (2)$$

Equation (1) and equation (2) assume that the rating level represents a baseline estimate of the resources and each of the additional factors modifies the baseline as a multiplicative ratio. In other embodiments, scalars and other types of numerical representations may also be used. Additionally, combinations of scalars and multipliers may be used. For example, the adjustment factors and the feature category value may be expressed as ratios, while the weight may be expressed as a scaler. In this case, the following equation may apply:

$$TRE = FCV(AF \times RL + W). \quad (3)$$

It will be understood that the equations (1), (2), and (3) are merely exemplary, and not meant to be limiting. Other factors may also be introduced by the needs of various embodiments, and different mathematical and logical operators may be used.

Turning back to flowchart 800, step 810 may elaborate on step 412 of FIG. 4 where the feature resource estimate (FRE) is computed. The method may also include computing a task resource estimate using the task resource estimates and/or the feature category value (810). In some embodiments, each of the task resource levels may represent a particular resource value. Therefore, each task resource level may be added together to compute a feature resource estimate. In embodiments that use a feature category value, the summation of the task resource estimates may be combined with the feature category value to determine the final feature resource estimate. For example, the following equation may be used to calculate the feature resource estimate:

$$FRE = FCV \times \Sigma AF \times RL \times W. \quad (4)$$

Equation (4) assumes that the feature category value is not included in each calculation of each task resource estimate. Other embodiments may move the FC Value inside the summation to include it in each task resource estimate for task analysis purposes.

Refining the Resource Estimation Process

The methods discussed so far can be used to calculate task resource estimates and a feature resource estimate using a multifactor approach that relies on user input, historical data, and/or combinations of these factors in order to generate an accurate result. Generally, this result may be placed in a project plan or project tracking software application. These estimates may be used to make purchases, estimate costs, hire or fire employees, and/or the like. Eventually, the future development cycle may be carried out in practice and the product, application, and/or service may actually be performed, developed, and/or manufactured.

After the development cycle of the feature is complete, an estimate of the actual resource usage may be provided to the resource estimation process. In other words, the actual amount of resources utilized during the feature development cycle may be compared to the original estimate. This comparison may be used to refine the resource estimation process and/or the multiple factors that were used to generate the estimation.

Many different types of feedback processes may be used to adjust the factors and/or process. Described below are but two examples of ways in which the factors used in the estimation process may be adjusted based on actual usage values. Other methods of altering the input factors are also contemplated by various embodiments, but are not described explicitly herein for brevity. One having skill in the art could alter these examples to adjust other factors using different mathematical and/or logical operators after reading this disclosure.

Figure 9:
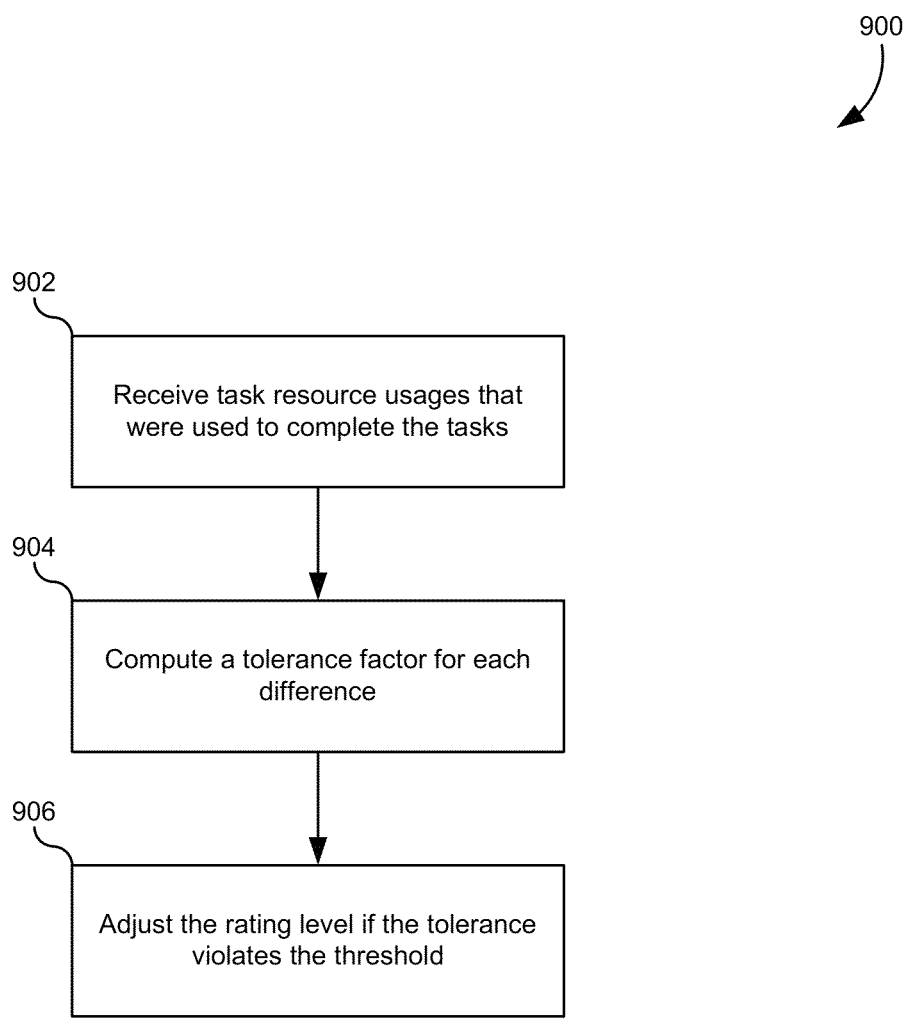
FIG. 9 illustrates a flowchart of a feedback method, according to one embodiment.

FIG. 9 illustrates a flowchart 900 of a feedback method, according to one embodiment. The method may include receiving task resource usages that were used to complete the tasks (902). The task resource usages may represent estimates or actual recorded values. The task resource usages may be retrieved from a timecard system, a time charging system, a project management software system, may be provided by a project supervisor, may be input manually by various employees using workstations that are communicatively coupled to the resource estimation system, and/or the like.

The method may also include computing a tolerance factor based on a difference between an estimated factor and an actual usage factor (904). Depending on the embodiment, different factors or combination of factors may be used. Merely for exemplary purposes, a rating level may be used, along with other factors. In embodiments where the rating level represents a baseline amount of resources, the actual resource usages can be compared to the rating level. For example, if a rating level of five person effort days was used to calculate a resource estimate, and the feature development cycle took six person effort days to complete, a tolerance factor may be computed as 20% representing a 20% difference between the actual and estimated values. Conceptually, the tolerance factor of 20% may represent how much the baseline factor deviates from the actual usage.

Note that in this example, the rating level is compared directly to the usage. In this case, the eventual goal of the resource estimation system may be to eliminate the need for adjustment factors, weights, and the feature category value when estimating a resource amount. In other embodiments, the task resource estimate or the feature resource estimate may be compared to the task/feature resource usages provided to the system. In these cases, the eventual goal of the resource estimation system may be to recognize that varying situations may apply, and that a baseline resource value may be correct only when properly adjusted using the multiple factors. In this case, instead of comparing a rating level, a tolerance factor may be generated using any of the factors, including the feature category value, the weight, and/or the adjustment factors, and may use both estimated and actual values.

Continuing with the example the rating level, if the tolerance factor violates a threshold value, the original rating level assigned to the particular task may be adjusted up or down. The threshold value may be 1%, 5%, 10%, 15%, 20%, 25%, 50%, and/or the like. Smaller tolerance values may be used after many iterations, while larger tolerance values may be used for initial iterations. Adjusting the stored rating level may include averaging it with the actual usage and other historical usage values that were previously recorded.

Figure 10:
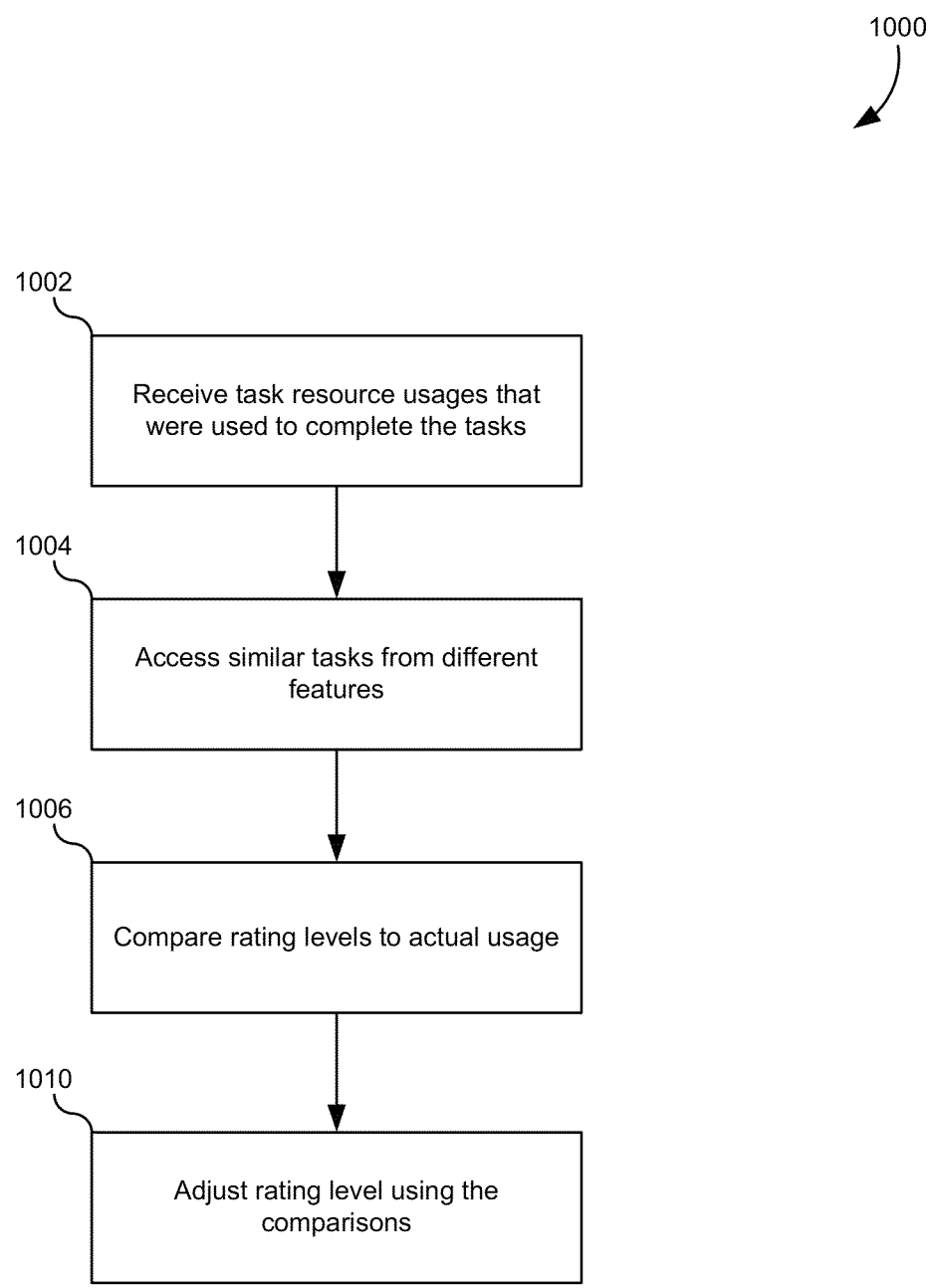
FIG. 10 illustrates a flowchart of a feedback method across multiple features, according to one embodiment.

Flowchart 900 deals with adjusting rating levels for tasks based on historical usage values for that task. In some embodiments, rating levels can be adjusted by analyzing actual resource usage values for that task when performed for different features. FIG. 10 illustrates a flowchart 1000 of a feedback method across multiple features, according to one embodiment. The method may include receiving task resource usages that were used to complete the tasks (1002). As multiple task resource usages may be required, these may be input at varying times and in relation to various projects.

The method may also include accessing similar tasks from different features (1004). In some embodiments, these different features may be from different feature categories. In other embodiments, each feature may be taken from the same feature category. For example, design review may be a common task performed in different features from different feature categories. The method may also include comparing the rating level to actual resource usage levels (1006), and adjusting the rating level using the comparisons (1010). In many cases, a single rating level may be assigned to the particular task. That rating level may be adjusted up or down based on the historical usage data recorded. As described above, the adjustment may be made based on a calculated tolerance factor that is computed from a threshold value.

It should be appreciated that the specific steps illustrated in FIGS. 4, 8, 9, and 10 provide particular methods of estimating resources according to various embodiments of the present invention. Other sequences of steps may also be performed according to alternative embodiments. For example, alternative embodiments of the present invention may perform the steps outlined above in a different order. Moreover, the individual steps illustrated in FIGS. 4, 8, 9, and 10 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 11:
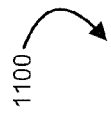
FIG. 11 illustrates a diagram of a feedback method across multiple features, according to one embodiment.

FIG. 11 illustrates a diagram 1100 of a feedback method across multiple features, according to one embodiment. This example may illustrate several of the concepts discussed above. In particular, actual resource usage may be compared with resource estimates for a single task type across a number of different features. In this embodiment, a single task 1104 of designer view may be compared across three different features 1102. In each case, the task rating level 1106 was "low," corresponding to 5 person effort days as defined 1106.

At some point after the resources were estimated for each of the tasks 1104, an actual resource usage 1110 representing an actual number of person days was recorded and entered into the system. A variance 1112 was calculated and used as the tolerance factor, and compared to a tolerance threshold 1114 of 5%. Note that the third iteration of the design review task exceeded the rating level. However, because the tolerance factor (variance) did not violate the threshold level, the difference was discarded. Using the comparison between the actual resource usage and the resource estimates, a new rating level of 5.33 was established. Future design review tasks could then use a defined value of 5.33 person effort days for the rating level of "low."

Figure 12:
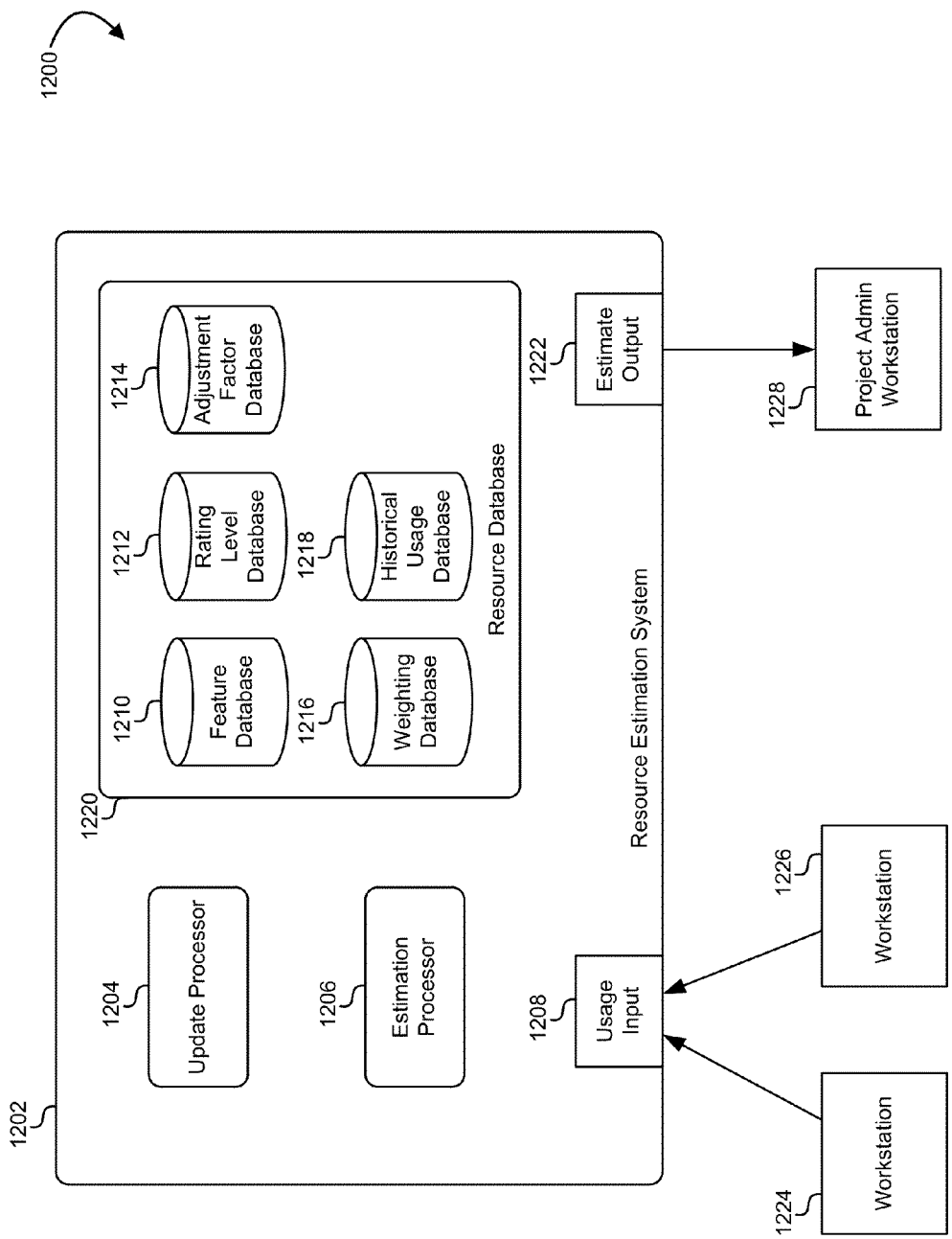
FIG. 12 illustrates a schematic of a system for estimating resources, according to one embodiment.

FIG. 12 illustrates a schematic 1200 of a system for estimating future resources, according to one embodiment. The methods described above may be implemented in a computer system, such as computer system 200 of FIG. 2, using a general-purpose processor. In other embodiments, the methods described above may be implemented by a special-purpose hardware system. This dedicated hardware may be designed using processors, memories, microcontrollers, buses, communication ports, network access ports, adapters, digital circuits, analog circuits, instruction sets, and/or the like, that are well-known in the art and would be readily understood by one having skill in the art. After reading this disclosure, a hardware system could be specifically designed to implement these processes using known methods. In other words, some embodiments described herein may be implemented as a special-purpose computer system specifically designed to estimate resource usage. In some embodiments, the special-purpose computer system may include instructions stored on a tangible medium the cause a processing element to operate. In other embodiments, the special-purpose computer system may operate using logical functions implemented with digital hardware instead of using instructions and processors.

A resource estimation system 1202 may include an estimation processor 1206 configured to receive information from the resource database 1220 and output an estimate through an estimate output 1222 to be read by a project administrator workstation 1228. The estimation processor 1206 may be implemented using a microprocessor, a microcontroller, a lookup table, digital logic circuits, and/or the like.

The resource database 1220 may include a number of storage elements. In some embodiments these additional storage elements may also be referred to as databases. The resource database 1220 may include a feature database 1210 configured to store and provide features, workflows associated with features, tasks associated with features, feature category values, and/or other information related to features and feature categories. Also included may be a rating level database 1212 configured to store rating levels and historical rating levels related to particular tasks and/or features. Additionally, an adjustment factor database 1214 may be included that is configured to store various adjustment factors and a history of how the adjustment factors have been assigned to various tasks in various development cycles. Also included may be a weighting database configured to store weights. Finally, a historical usage database 1218 may be included and configured to store actual resource usage levels as provided after the development cycles are completed.

The resource estimation system 1202 may also include an update processor 1204. Like the estimation processor 1206, the update processor 1204 may be implemented using a processor, a microcontroller, digital logic circuits, a lookup table, and/or the like. The update processor 1204 may be configured to receive inputs from a usage input interface 1208 from one or more user workstations 1224, 1226. The update processor 1204 may be configured to compare information received from the historical usage database 1218 and/or the usage input interface 1208 in order to update rating levels stored in the rating level database 1212, adjustment factors stored in the adjustment factor database 1214, and/or weights stored in the weighting database 1216.

In one embodiment, the various modules and systems in FIG. 12 may reside on separate computer systems. Alternatively, multiple modules may be combined on the same or similar computer systems. In addition, some modules may be combined together into a single module performing the functions of both individual modules. Similarly, a single module may be split into multiple modules. It will be understood in light of this disclosure that any arrangement of the modules, as well as any implementation in both software and hardware, may be used by various embodiments.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of estimating development resources in a feature development cycle, the method comprising:
   receiving, by a processor, a selection of a feature;
   receiving or determining, by the processor, for the feature, a feature category from among a plurality of feature categories;
   receiving, by the processor, a feature category value that numerically characterizes resources required for the feature category relative to resources required for others of the plurality of feature categories;
   determining, by the processor, one or more tasks associated with the feature category;
   assigning, by the processor, a rating level to each of the one or more tasks, wherein the rating level characterizes the resources required to complete the respective task;
   assigning, by the processor, an adjustment factor to each of the one or more tasks;
   computing, by the processor, a task resource estimate for each of the one or more tasks using the corresponding rating levels and the corresponding adjustment factors, wherein the corresponding rating levels are distinct from the corresponding adjustment factors; and
   computing, by the processor, a feature resource estimate for the feature using a summation of the task resource estimates and scaling the summation by the feature category value.

2. The method of claim 1 further comprising:
   receiving task resource usages that were used to complete each of the one or more tasks;
   computing tolerance factors using a difference between each of the task resource usages and each of the corresponding task resource estimates; and
   adjusting the rating level assigned to each of the one or more tasks if the corresponding tolerance factor meets or exceeds a threshold value.

3. The method of claim 2 further comprising:
   receiving a selection of a first task in the one or more tasks;
   accessing a plurality of tasks, wherein:
      each of the plurality of tasks is similar to the first task;
      each of the plurality of tasks is assigned a first rating level; and
      each of the plurality of tasks is associated with different features; and
   adjusting the first rating level based on a comparison between the first rating level and a plurality of task resource usages associated with the plurality of tasks.

4. The method of claim 3 wherein the first rating level represents a number of person effort days.

5. The method of claim 1 further comprising assigning a weight to each of the one or more tasks, wherein each task resource estimate for each of the one or more tasks is computed using the corresponding weight.

6. The method of claim 5 wherein the weights represent increases or decreases to the corresponding rating levels based on evaluations of historical task resource usages previously recorded in association with the corresponding task.

7. The method of claim 1 wherein the adjustment factors represent increases or decreases to the corresponding rating levels based on evaluations of the corresponding task environment.

8. A non-transitory computer-readable memory comprising a sequence of instructions which, when executed by one or more processors, causes the one or more processors to estimate development resources in a feature development cycle by:
   receiving a selection of a feature;
   receiving or determining, for the feature, a feature category from among a plurality of feature categories;
   receiving a feature category value that numerically characterizes resources required for the feature category relative to resources required for others of the plurality of feature categories;
   determining one or more tasks associated with the feature category;
   assigning a rating level to each of the one or more tasks, wherein the rating level characterizes the resources required to complete the respective task;
   assigning an adjustment factor to each of the one or more tasks;
   computing a task resource estimate for each of the one or more tasks using the corresponding rating levels and the corresponding adjustment factors, wherein the corresponding rating levels are distinct from the corresponding adjustment factors; and
   computing a feature resource estimate for the feature using a summation of the task resource estimates and scaling the summation by the feature category value.

9. The non-transitory computer-readable memory according to claim 8 wherein the instructions further cause the one or more processors to estimate development resources in a feature development cycle by:
   receiving task resource usages that were used to complete each of the one or more tasks;
   computing tolerance factors using a difference between each of the task resource usages and each of the corresponding task resource estimates; and
   adjusting the rating level assigned to each of the one or more tasks if the corresponding tolerance factor meets or exceeds a threshold value.

10. The non-transitory computer-readable memory according to claim 9 wherein the instructions further cause the one or more processors to estimate development resources in a feature development cycle by:
   receiving a selection of a first task in the one or more tasks;
   accessing a plurality of tasks, wherein:
      each of the plurality of tasks is similar to the first task;
      each of the plurality of tasks is assigned a first rating level; and
      each of the plurality of tasks is associated with different features; and
   adjusting the first rating level based on a comparison between the first rating level and a plurality of task resource usages associated with the plurality of tasks.

11. The non-transitory computer-readable memory according to claim 10 wherein the first rating level represents a number of person effort days.

12. The non-transitory computer-readable memory according to claim 8 wherein the instructions further cause the one or more processors to estimate development resources in a feature development cycle by assigning a weight to each of the one or more tasks, wherein each task resource estimate for each of the one or more tasks is computed using the corresponding weight.

13. The non-transitory computer-readable memory according to claim 12 wherein the weights represent increases or decreases to the corresponding rating levels based on evaluations of historical task resource usages previously recorded in association with the corresponding task.

14. A system comprising:
one or more processors; and
a memory communicatively coupled with and readable by the one or more processors and comprising a sequence of instructions which, when executed by the one or more processors, cause the one or more processors to estimate development resources in a feature development cycle by:
receiving a selection of a feature;
receiving or determining, for the feature, a feature category from among a plurality of feature categories;
receiving a feature category value that numerically characterizes resources required for the feature category relative to resources required for others of the plurality of feature categories;
determining one or more tasks associated with the feature category;
assigning a rating level to each of the one or more tasks, wherein the rating level characterizes the resources required to complete the respective task;
assigning an adjustment factor to each of the one or more tasks;
computing a task resource estimate for each of the one or more tasks using the corresponding rating levels and the corresponding adjustment factors, wherein the corresponding rating levels are distinct from the corresponding adjustment factors; and
computing a feature resource estimate for the feature using a summation of the task resource estimates and scaling the summation by the feature category value.

15. The system of claim 14 wherein the instructions further cause the one or more processors to estimate development resources in a feature development cycle by:
receiving task resource usages that were used to complete each of the one or more tasks;
computing tolerance factors using a difference between each of the task resource usages and each of the corresponding task resource estimates; and
adjusting the rating level assigned to each of the one or more tasks if the corresponding tolerance factor meets or exceeds a threshold value.

16. The system of claim 15 wherein the instructions further cause the one or more processors to estimate development resources in a feature development cycle by:
receiving a selection of a first task in the one or more tasks;
accessing a plurality of tasks, wherein:
each of the plurality of tasks is similar to the first task;
each of the plurality of tasks is assigned a first rating level; and
each of the plurality of tasks is associated with different features; and
adjusting the first rating level based on a comparison between the first rating level and a plurality of task resource usages associated with the plurality of tasks.

17. The system of claim 16 wherein the first rating level represents a number of person effort days.

18. The system of claim 14 wherein the instructions further cause the one or more processors to estimate development resources in a feature development cycle by assigning a weight to each of the one or more tasks, wherein each task resource estimate for each of the one or more tasks is computed using the corresponding weight.

19. The system of claim 18 wherein the weights represent increases or decreases to the corresponding rating levels based on evaluations of historical task resource usages previously recorded in association with the corresponding task.

\* \* \* \* \*

UNITED STATES PATENT AND TRADEMARK OFFICE
CERTIFICATE OF CORRECTION

PATENT NO. : 9,076,114 B2
APPLICATION NO. : 13/804978
DATED : July 7, 2015
INVENTOR(S) : Alonzo et al.

Page 1 of 1

It is certified that error appears in the above-identified patent and that said Letters Patent is hereby corrected as shown below:

On page 2, in column 1, under other publications, delete "[Retrived" and insert -- [Retrieved --, therefor.

Signed and Sealed this
Twenty-first Day of June, 2016

Michelle K. Lee
*Director of the United States Patent and Trademark Office*